(12) United States Patent
Kim et al.

(10) Patent No.: US 11,066,318 B2
(45) Date of Patent: Jul. 20, 2021

(54) GREEN GLASS COMPOSITION

(71) Applicant: KCC CORPORATION, Seoul (KR)

(72) Inventors: Yongyi Kim, Gyeonggi-do (KR); Younmin Cho, Gyeonggi-do (KR); Seongyeob Yoo, Gyeonggi-do (KR)

(73) Assignee: KCC Glass Corporation, Seoul (KR)

(*) Notice: Subject to any disclaimer, the term of this patent is extended or adjusted under 35 U.S.C. 154(b) by 0 days.

(21) Appl. No.: 16/308,649

(22) PCT Filed: May 17, 2017

(86) PCT No.: PCT/KR2017/005111
§ 371 (c)(1),
(2) Date: Dec. 10, 2018

(87) PCT Pub. No.: WO2017/222187
PCT Pub. Date: Dec. 28, 2017

(65) Prior Publication Data
US 2019/0270664 A1    Sep. 5, 2019

(30) Foreign Application Priority Data
Jun. 23, 2016 (KR) .................. 10-2016-0078360

(51) Int. Cl.
| C03B 5/225 | (2006.01) |
| C03C 3/087 | (2006.01) |
| C03C 4/02 | (2006.01) |
| C03C 4/08 | (2006.01) |
| C03C 1/00 | (2006.01) |

(52) U.S. Cl.
CPC .............. C03B 5/225 (2013.01); C03C 1/004 (2013.01); C03C 3/087 (2013.01); C03C 4/02 (2013.01); C03C 4/08 (2013.01); C03C 4/085 (2013.01); C03C 2204/00 (2013.01)

(58) Field of Classification Search
CPC .... C03C 4/00; C03C 4/02; C03C 4/08; C03C 4/082; C03C 3/085; C03C 3/087
See application file for complete search history.

(56) References Cited

U.S. PATENT DOCUMENTS

| 4,792,536 A | 12/1988 | Pecoraro et al. |
| 5,523,263 A | 6/1996 | Penrod |
| 5,593,929 A | 1/1997 | Krumwiede et al. |
| 5,641,716 A | 6/1997 | Higby et al. |
| 5,723,390 A | 3/1998 | Kijima et al. |
| 5,776,845 A | 7/1998 | Boulos et al. |
| 5,830,812 A | 11/1998 | Shelestak et al. |
| 5,851,940 A | 12/1998 | Boulos et al. |
| 5,897,956 A | 4/1999 | Kijima et al. |
| RE37,328 E | 8/2001 | Pecoraro et al. |
| 6,551,953 B1 | 4/2003 | Gulotta et al. |
| 7,678,722 B2 | 3/2010 | Shelestak |
| 7,820,575 B2 | 10/2010 | Nagashima et al. |
| 8,318,054 B2 | 11/2012 | Cid-Aguilar et al. |
| 2007/0027021 A1 | 2/2007 | Shelestak |
| 2008/0026211 A1 | 1/2008 | Nagashima et al. |
| 2011/0297900 A1 | 12/2011 | Cid-Aguilar et al. |
| 2014/0162863 A1 | 6/2014 | Costin et al. |
| 2015/0307389 A1 | 10/2015 | He et al. |
| 2016/0194239 A1 | 7/2016 | Seto |

FOREIGN PATENT DOCUMENTS

| EP | 0820964 B1 | 12/2001 | |
| JP | H04193738 A | 7/1992 | |
| JP | H04224133 A | 8/1992 | |
| JP | H06191881 A | 7/1994 | |
| JP | H07165435 A | 6/1995 | |
| JP | 09208254 A * | 8/1997 | ............. C03C 3/095 |
| JP | H09208254 A | 8/1997 | |
| JP | H10297934 A | 11/1998 | |
| JP | 2000219534 A | 8/2000 | |
| JP | 3086165 B2 | 9/2000 | |
| JP | 2003528787 A | 9/2003 | |
| KR | 1019957002178 A | 6/1995 | |
| KR | 20000057443 A | 9/2000 | |
| KR | 100868306 B1 | 11/2008 | |
| KR | 101012997 B1 | 2/2011 | |
| KR | 20150091068 A | 8/2015 | |
| WO | 2005063643 A1 | 7/2005 | |
| WO | 2015033562 A1 | 3/2015 | |

OTHER PUBLICATIONS

JP2018-565416 Office Action dated Nov. 25, 2019, 12 pgs.
KR1020160078360 Notice of Allowance dated Mar. 28, 2019; 2 pgs.
PCT/KR2017/005111 Interantional Search Report dated Aug. 28, 2017; 5 pgs.
EP17815600.6 Extended European Search Report dated Jun. 11, 2019; 7 pgs.

* cited by examiner

Primary Examiner — Elizabeth A. Bolden
(74) Attorney, Agent, or Firm — Morgan, Lewis & Bockius LLP

(57) ABSTRACT

Embodiments relate to a green glass composition, which can reduce the cooling load of a building and a vehicle by effectively lowering solar heat ray and ultraviolet ray transmittance while ensuring a high visible light transmittance suitable for window glass without using a coloring agent such as Ce, Co and Cr, and also has excellent bubble quality; green glass manufactured therefrom; and a method for manufacturing green glass. According to at least one embodiment, there is provided a green glass composition including 0.65-1.3 wt % of $Fe_2O_3$, 0.1-0.4 wt % of $TiO_2$, and 0.05-0.20 wt % of $SO_3$, based on 100 wt % of a soda lime mother glass composition, wherein an oxidation-reduction ratio of $Fe_2O_3$ is 0.22 to 0.38.

9 Claims, No Drawings

GREEN GLASS COMPOSITION

CROSS-REFERENCE TO RELATED APPLICATIONS

This application claims the benefit of and priority to PCT/KR2017/005111, filed on May 17, 2017, entitled (translation), "GREEN GLASS COMPOSITION," which claims the benefit of and priority to Korean Patent Application No. 10-2016-0078360, filed on Jun. 23, 2016, each of which is incorporated by reference in its entirety into this application.

BACKGROUND

Field

Embodiments relate to a green glass composition.

Description of the Related Art

Generally, glasses used for the windows of vehicles are required to have high visible light transmittance (Tvis) for stably securing visibility and low solar heat radiation transmittance (Tds), low ultraviolet ray transmittance for user comfort. Also, it is required to minimize defects such as bubbles obstructing the view.

A coloring agent may be used to put color in glasses, and iron oxide which gives different colors according to an oxidized or reduced state, is mainly used as the coloring agent. Iron oxide may impart glasses with blue color in a ferrous oxide (FeO) state that is a reduced state, and may impart glasses with yellow color in a ferric oxide ($Fe_2O_3$) state that is an oxidized state. Iron oxide absorbs visible light and infrared rays in a reduced state, and absorbs visible light and ultraviolet rays in an oxidized state. Accordingly, if iron oxide is present, the transmittance of a glass product in the regions of visible light, infrared rays and ultraviolet rays may decrease.

$CeO_2$ may be used as another coloring agent of glasses. $CeO_2$ is effective in restraining the transmittance of ultraviolet rays but is an expensive rare earth material and thus, increases manufacturing costs inappropriately. Also, CoO and $Cr_2O_3$ may be used to partially add blue color and green color, but since CoO and $Cr_2O_3$ strongly absorb visible light, additional performance improvement of solar heat radiation transmittance is limited due to visible light loss.

As the conventional technique relating to a green glass composition, for example, EP Patent No. 0,820,964, U.S. Pat. Nos. 5,897,956, 5,830,812, etc. may be cited. However, there are defects of not securing high bubble quality, and using a costly component such as cerium oxide to degrade economic feasibility.

SUMMARY

Embodiments provide a green glass composition, which may reduce the cooling load of a building and a vehicle by effectively lowering solar heat ray and ultraviolet ray transmittance while ensuring a high visible light transmittance suitable for window glass without using a coloring agent such as Ce, Co and Cr, and also has excellent bubble quality; green glass manufactured therefrom; and a method for manufacturing green glass.

According to at least one embodiment, the green glass composition includes 0.65-1.3 wt % of $Fe_2O_3$, 0.1-0.4 wt % of $TiO_2$, and 0.05-0.20 wt % of $SO_3$ based on 100 wt % of a soda lime mother glass composition, where an oxidation-reduction ratio of $Fe_2O_3$ is 0.22 to 0.38.

According to at least one embodiment, the soda lime mother glass composition comprises 65-75 wt % of $SiO_2$, 0.3-3.0 wt % of $Al_2O_3$, 10-18 wt % of $Na_2O+K_2O$, 5-15 wt % of CaO and 1-7 wt % of MgO.

According to at least one embodiment, an amount of Cr, Ce and Co components is less than 0.001 wt % based on 100 wt % of the soda lime mother glass composition.

According to another embodiment, there is provided a method for preparing a green glass composition including a step of constituting a glass raw material batch such that a weight ratio of a Glauber salt to a reducing agent in the glass raw material batch becomes 10 to 60.

According to at least one embodiment, the reducing agent is selected from the group consisting of anthracite, coal, petroleum coke, coke, charcoal, wood charcoal and the combination thereof.

The green glass of the various embodiments shows, on the basis of a standard thickness of the glass of 3.2 mm, visible light transmittance (Tvis) of 70% or more, solar heat radiation transmittance (Tds) of 55% or less, and ultraviolet ray transmittance (Tuv) of 45% or less.

DETAILED DESCRIPTION

Hereinafter, various embodiments will be explained in more detail.

According to at least one embodiment, there is provided a green glass composition, which includes 0.65-1.3 wt % of $Fe_2O_3$, 0.1-0.4 wt % of $TiO_2$, and 0.05-0.20 wt % of $SO_3$ based on 100 wt % of a soda lime mother glass composition, where an oxidation-reduction ratio of $Fe_2O_3$ is 0.22 to 0.38.

According to at least one embodiment, ironn (Fe) may be included as impurities in the major/minor materials of glass and is a component that may be present in glass to a degree of 0.1-0.2 wt % without additional input during common commercial production. The desired transmittance and color of most colored glasses are controlled by additional input of iron, which may be added in forms of iron oxide ($Fe_2O_3$). The iron oxide injected during the melting process of glass may be present as $Fe^{3+}$ and $Fe^{2+}$.

According to at least one embodiment, $Fe^{3+}$ ions have weak absorption in a visible light region of 410-440 nm, and strong absorption edge near ultraviolet rays centering around 380 nm. Thus, the more the $Fe^{3+}$ ions are present, the lighter yellow color of glass is shown. In addition, $Fe^{2+}$ ions have a strong absorption edge centering around 1050 nm and thus, are known to absorb infrared rays. With the increase of the $Fe^{2+}$ content, the color of glass changes into blue color.

According to at least one embodiment, common plate glass uses a Glauber salt as a clarifying agent for defoaming bubbles, and after a clarifying process, residual $SO_3$ remains in glass. The residual amount of $SO_3$ is largely affected by the ratio of the Glauber salt to the reducing agent used. The amount of $Fe_2O_3$ of the green glass composition according to various embodiments may be 0.65-1.30 wt % based on 100 wt % of the soda lime mother glass composition, for example, 0.70-1.2 wt %. If the amount is greater than 1.30 wt %, the transmittance of visible light is extremely decreased and it is hard to use the composition in the window of vehicles and buildings. Also, when the amount of $Fe^{2+}$ that absorbs radiated infrared rays increases, problems such as the decrease of the temperature at a lower part in a melting furnace may be induced during melting. If the amount is less than 0.65 wt %, the transmittance of solar heat radiation increases, and effective decrease of the cooling load of buildings and vehicles may not be achieved.

According to at least one embodiment, the oxidation-reduction ratio of the green glass composition may be 0.22 to 0.38, for example, 0.25 to 0.35. If the oxidation-reduction ratio is less than 0.22, the probability of the yellow coloring of glass increases, and if the oxidation-reduction ratio is greater than 0.38, the probability of the blue coloring of glass increases, and accordingly, it is difficult to achieve the feature of green glass.

According to at least one embodiment, the term "oxidation-reduction ratio" means the weight ratio of ferrous oxide ($Fe^{2+}$ ion) represented by FeO with respect to the weight of total iron represented by an oxide, $Fe_2O_3$. Generally, this could be controlled by using an oxidizing agent such as sodium sulfate which is an auxiliary agent for cleaning and melting and a reducing agent such as coke.

According to at least one embodiment, titanium (Ti) may be included as a titanium oxide type and supplied to a batch, or may be included as impurities mineral such as silica. $Ti^{3+}$ has an absorption edge around 540 nm, and $Ti^{4+}$ has an absorption edge around 300 nm. Due to the influence of such absorption edges, titanium may give glass with yellow color and absorb ultraviolet rays.

The amount of $TiO_2$ in the various embodiments is 0.1-0.4 wt % based on 100 wt % of the soda lime mother glass composition. If the amount of $TiO_2$ is greater than 0.4 wt %, glass shows yellow color, and the glass feature of beautiful green color may not be achieved and the loss of visible light transmittance may be significant.

In order to keep green color in balance and secure effective ultraviolet ray absorption performance, the amount of $TiO_2$ may be, for example, 0.10-0.38 wt %, for example, 0.12-0.35 wt %.

According to at least one embodiment, $SO_3$ is a component remaining in glass during the decomposition process of Glauber salt ($Na_2SO_4$) which is used for removing bubbles from glass and promoting the melting of raw materials, and the amount of $SO_3$ may be 0.05-0.20 wt % based on 100 wt % of the soda lime mother glass composition. If the amount is less than 0.05 wt %, it is a sign that an insufficient amount of the Glauber salt for promoting the melting of raw materials is added, or the Glauber salt is decomposed in an early stage and effective participation in melting and clarifying processes is not achieved. Accordingly, lots of defects due to unmelted materials and bubble defects in the glass may be formed. If the amount is greater than 0.20 wt %, it is a sign that an excessive amount of the Glauber salt is included or the decomposition of the Glauber salt is delayed and effective participation in a clarifying process is not achieved. Accordingly, a plurality of bubble defects is formed in the glass. Generally, in a float glass industry, the Glauber salt is used in an amount of 10-40 kg with respect to 2000 kg of silica, and is controlled according to the conditions of a melting furnace atmosphere.

According to at least one embodiment, the decomposition rate of such Glauber salt may be controlled by additional input of one selected from the group consisting of anthracite, coal, petroleum coke, coke, charcoal, wood charcoal and the combination thereof, which are reducing agents including carbon (C).

Though not specifically limited, the green glass composition of the various embodiments may include Cr, Ce and Co components in an amount of less than 0.001 wt % based on 100 wt % of the soda lime mother glass composition. If deviated from this range, manufacturing costs may increase, or the performance improvement of solar heat radiation transmittance may be limited.

Meanwhile, the coloring agent may be used in the amount range with respect to 100 wt % of the mother glass composition, and the main constituent components of the mother glass may be used in component ranges listed in Table 1 below.

TABLE 1

| Component | Amount (wt %) |
|---|---|
| $SiO_2$ | 65-75 |
| $Al_2O_3$ | 0.3-3.0 |
| $Na_2O + K_2O$ | 10-18 |
| CaO | 5-15 |
| MgO | 1-7 |

According to at least one embodiment, $SiO_2$ plays the role of a forming agent of a network structure which forms the basic structure of glass. If the amount is less than 65 wt %, there is a problem with the durability of glass, and if the amount is greater than 75 wt %, a viscosity at a high temperature increases and melting properties are degraded.

According to at least one embodiment, $Al_2O_3$ increases the viscosity at a high temperature of glass and is a component improving the durability of glass with a small amount added. If the amount is less than 0.3 wt %, chemical resistance and water resistance may become vulnerable, and if the amount is greater than 3 wt %, the viscosity at a high temperature increases and melting load increases.

According to at least one embodiment, $Na_2O$ and $K_2O$ are flux components that promote the melting of glass raw materials. If the total amount of the two components is less than 10 wt %, the production of an unmelted product increases, and the quality of melting may be degraded, and if the amount is greater than 18 wt %, chemical resistance may be degraded.

According to at least one embodiment, CaO and MgO are components assisting the melting of raw materials and reinforcing the climate resistance of a glass structure. If the amount of CaO is less than 5 wt %, durability may be degraded, and if the amount is greater than 15 wt %, crystallization tendency increases and the product quality may be adversely affected. In addition, if the amount of MgO is less than 1 wt %, the aforementioned effects may decrease, and if the amount is greater than 7 wt %, crystallization tendency increases, and the increase of crystal defects is induced.

According to another embodiment, there is provided a method for preparing a green glass composition, including constituting a glass raw material batch such that a weight ratio of a Glauber salt and a reducing agent in the glass raw material batch becomes 10 to 60.

Generally, a method for preparing glass comprises a step of mixing a raw material batch for preparing a glass composition, a step of adding the mixed raw material batch into a melting furnace for melting to prepare a glass melt, a step of clarifying the glass melt, and a step of molding the clarified glass composition into plate glass. The method for preparing the green glass composition of the various embodiments delimits the weight ratio of a Glauber salt and a reducing agent in a raw material batch while preparing a glass composition, and may provide green glass of the various embodiments by which visible light transmittance which is appropriate for window glass may be secured and solar heat radiation and ultraviolet ray transmittance may be effectively decreased.

According to at least one embodiment, the raw material batch means a mixture obtained by mixing raw materials such as silica, soda ash, dolomite, lime stone, etc., and a final composition obtained by melting and clarifying the raw material batch prior to molding glass is the glass composition.

According to at least one embodiment, if the weight ratio of the Glauber salt and the reducing agent is less than 10, the Glauber salt is decomposed in an early stage, and appropriate melting promotion and clarifying effect may not be achieved, and if the weight ratio is greater than 60, delayed decomposition may take place, and appropriate clarifying effect may not be achieved to generate a plurality of bubble defects. In the ratio, the reducing agent indicates a raw material including carbon (C) as a main component, and slags are excluded.

According to another embodiment, as the green glass manufactured using the green glass composition, there is provided green glass having visible light transmittance (Tvis) of 70% or more, solar heat radiation transmittance (Tds) of 55% or less, and ultraviolet ray transmittance (Tuv) of 45% or less, on the basis of the standard thickness of the glass of 3.2 mm.

The green glass according to various embodiments may be applied as safety glass for vehicles or as the window glass of buildings. The safety glass for vehicles may be applied as the visible panel of front surface, side surface and rear surface, but the use thereof is not limited thereto.

Based on a glass thickness of 3.2 mm, the green glass of the various embodiments has the visible light transmittance (Tvis) of 70% or more, the solar heat radiation transmittance (Tds) of 55% or less, and the ultraviolet ray transmittance (Tuv) of 45% or less, and may be useful as the window of vehicles and buildings.

If the visible light transmittance is less than 70% due to the controlling matter of the amount of a coloring agent, the application of the green soda lime glass to the window of buildings may be limited and the visibility secure for observing outside may become difficult. Particularly, big problems may arise in parts requiring visibility secure such as the visible panel of front, side and rear surfaces among safety glass for vehicles.

According to at least one embodiment, the solar heat radiation transmittance is required to be managed to 55% or less, based on 3.2 mm in order to save the cooling load of buildings and vehicles. In addition, the ultraviolet ray transmittance is required to be managed to 45% or less, based on 3.2 mm in order to prevent the color change of interior materials in buildings and vehicles.

Hereinafter, the various embodiments will be explained in more detail referring to examples and comparative examples. However, the scope of the various embodiments is not limited thereto.

EXAMPLES

Sample glass for analyzing the chemical components of a glass composition and evaluating optical properties was manufactured using a Pt-10% Rh crucible, via a gas furnace and an electrical furnace. A weighed raw material batch based on 500 g was molten in a gas furnace at 1450° C. for 1 hour and rapidly cooled to recover a glass powder. After that, melting in an electrical furnace at 1450° C. for 1 hour was repeated twice to manufacture a sample with improved homogeneity.

In addition, a sample for measuring the number of remaining bubbles, i.e., for evaluating melting quality was manufactured using a cylindrical alumina crucible having a diameter of 5 cm and a height of 10 cm, by weighing the same batch, based on 500 g, as the sample glass manufactured for the chemical component analysis and optical property evaluation of the glass composition, and melting the same in a gas furnace for 3 hours.

As raw materials, silica, feldspar, lime stone, dolomite, soda ash, Glauber salt and iron oxide were used, and glass batches of which mixing ratios were controlled to obtain target compositions referred in the examples and the comparative examples below, were molten using a gas furnace or an electrical furnace.

A soda lime glass composition constituted of 71.0 wt % of $SiO_2$, 1.3 wt % of $Al_2O_3$, 9.8 wt % of CaO, 3.85 wt % of MgO, 13.9 wt % of $Na_2O$, and 0.15 wt % of $K_2O$, based on 100 wt % of a mother glass composition excluding $SO_3$ and a coloring agent in the glass composition, was used.

Based on 100 wt % of the soda lime mother glass composition, the coloring agent with the amount referred in the examples and the comparative examples was injected, the glass thus manufactured was cast molded using a graphite plate, and sample glass was processed into a thickness of 3.2 mm to evaluate physical properties.

The chemical composition analysis of the glass composition was conducted using 3370 X-ray fluorescence analyzer (XRF) of Rigaku Co.

The optical properties were measured using apparatuses as follows.

Visible light transmittance was measured using a HUNTER LAB colorimeter apparatus by CIE 1931 Yxy/2 chromaticity diagram vision (light source A).

Solar heat radiation transmittance and ultraviolet transmittance were measured according to ISO 13837 regulation by using Perkin Elmer Lambda 950 spectrophotometer.

The main wavelength and excitation purity were measured using a HUNTER LAB colorimeter apparatus by CIE 1931 Yxy/2 chromaticity diagram vision (light source C).

The soda lime mother glass components (excluding $SO_3$ and coloring agent) of each of the examples and the comparative examples are listed in Table 2 below, and the amount of the coloring agent and the optical property values thus measured are listed in Table 2 to Table 4 below. The glauber salt content is an amount with respect to 2,000 kg of silica in Table 3 and Table 4.

TABLE 2

| Mother glass composition (wt %) | | |
|---|---|---|
| | $SiO_2$ | 71.0 |
| | $Al_2O_3$ | 1.3 |
| | CaO | 9.8 |
| | MgO | 3.85 |
| | $Na_2O$ | 13.9 |
| | $K_2O$ | 0.15 |

TABLE 3

| | Examples | | | | |
|---|---|---|---|---|---|
| Division | 1 | 2 | 3 | 4 | 5 |
| T-$Fe_2O_3$ (%) | 0.66 | 0.78 | 0.82 | 0.85 | 1.14 |
| $TiO_2$ (%) | 0.31 | 0.25 | 0.35 | 0.23 | 0.12 |
| $SO_3$ (%) | 0.15 | 0.08 | 0.12 | 0.16 | 0.18 |
| Oxidation-reduction ratio | 0.3 | 0.35 | 0.32 | 0.28 | 0.25 |
| Tvis (%) | 78.3 | 71.8 | 73 | 74.7 | 70.4 |
| Tds (%) | 54.5 | 45.3 | 46.6 | 49.6 | 43.8 |
| Tuv (%) | 43.2 | 40.2 | 37.6 | 33.8 | 18.6 |
| Glauber salt content (kg) | 20.1 | 12.0 | 25.6 | 32.3 | 39.0 |

TABLE 3-continued

| Division | Examples | | | | |
|---|---|---|---|---|---|
| | 1 | 2 | 3 | 4 | 5 |
| Glauber salt/reducing agent ratio | 33.5 | 11.5 | 22.3 | 13.4 | 53.6 |
| Bubble number (ea/m$^3$) | 40 | 21 | 33 | 45 | 70 |

TABLE 4

| Division | Comparative Examples | | | |
|---|---|---|---|---|
| | 1 | 2 | 3 | 4 |
| T-Fe$_2$O$_3$ (%) | 0.62 | 1.3 | 0.66 | 0.82 |
| TiO$_2$ (%) | 0.03 | 0.05 | 0.35 | 0.35 |
| SO$_3$ (%) | 0.25 | 0.3 | 0.33 | 0.04 |
| Oxidation-reduction ratio | 0.3 | 0.25 | 0.2 | 0.45 |
| Tvis (%) | 78.5 | 66.8 | 84 | 64 |
| Tds (%) | 56 | 38.9 | 62.7 | 33.4 |
| Tuv (%) | 43.5 | 11.1 | 39.4 | 44 |
| Glauber salt content (kg) | 39.0 | 32.3 | 39 | 12.0 |
| Glauber salt/reducing agent ratio | 100.1 | 75.1 | 7.9 | 4.1 |
| Bubble number (ea/m$^3$) | 132 | 145 | 264 | 163 |

Examples 1-5 described in Table 3 provide green soda lime glass compositions having high visible light transmittance, low solar heat radiation transmittance and ultraviolet transmittance, and excellent bubble quality.

Comparative Examples 1-4 in Table 4 show experimental results for verifying the conventional technique and the examples, and unsatisfactory results were found as follows. In Comparative Examples 1 and 2, the amount ranges of Fe$_2$O$_3$ and TiO$_2$ were deviated from the suggested ranges of the various embodiments, respectively. Comparative Example 1 corresponded to a case where the amounts of Fe$_2$O$_3$ and TiO$_2$ were excessively small, and high solar heat radiation transmittance and ultraviolet transmittance were shown. Comparative Example 2 corresponded to a case where the amount of Fe$_2$O$_3$ was excessively large, and low visible light transmittance (<70%) was shown. In addition, the ratio of the Glauber salt and the reducing agent was greater than the ratio suggested in the configuration of the various embodiments, and lots of bubbles were produced when compared with the examples, and inferior results were shown in glass quality.

In Comparative Examples 3 and 4, the oxidation-reduction ratio (FeO/total Fe$_2$O$_3$) was found to deviate from the suggested range by the configuration of the various embodiments. Comparative Example 4 corresponded to a case where the reduction ratio was excessively large, and low visible light transmittance (<70%) was shown, and Comparative Example 3 corresponded to a case where the reduction ratio was excessively small, and high solar heat radiation transmittance (>55%) was shown.

In addition, if the ratio of the Glauber salt to the reducing agent was below the suggested ratio by the configuration of the various embodiments, inferior results of bubble quality were obtained when compared with the examples.

Accordingly, the green glass composition of the various embodiments may provide green glass having high visible light transmittance, low solar heat radiation transmittance and ultraviolet transmittance, and excellent bubble quality.

By using the green glass composition of the various embodiments, green glass showing high visible light transmittance, low solar heat radiation transmittance and ultraviolet ray transmittance, and accomplishing excellent bubble quality may be provided, and thus, may be appropriately used as the windows of buildings and vehicles.

The invention claimed is:

1. A method for preparing a green glass composition, the method comprising:
    constituting a glass raw material batch such that a weight ratio of Glauber salt to a reducing agent in the glass raw material batch becomes 10 to 60,
    wherein the green glass composition comprises 65-75 wt % of SiO$_2$, 0.3-3.0 wt % of Al$_2$O$_3$, 10-18 wt % of Na$_2$O+K$_2$O, 5-15 wt % of CaO, 1-7 wt % of MgO, 0.65-1.3 wt % of Fe$_2$O$_3$, 0.1-0.4 wt % of TiO$_2$, and 0.05-0.20 wt % of SO$_3$, based on 100 wt % of a soda lime mother glass composition,
    wherein an oxidation-reduction ratio of Fe$_2$O$_3$ is 0.22 to 0.38, and
    wherein each one of Cr, Ce and Co components has an amount of less than 0.001 wt % based on 100 wt % of the soda lime mother glass composition.

2. The method according to claim 1, wherein the weight ratio of Glauber salt to a reducing agent in the glass raw material batch becomes 11.5 to 53.6.

3. The method for preparing the green glass composition according to claim 1, wherein the reducing agent is selected from the group consisting of anthracite, coal, petroleum coke, coke, charcoal, wood charcoal and the combination thereof.

4. The method according to claim 1, wherein the Glauber salt is used in an amount of 10-40 kg with respect to 2000 kg of silica.

5. The method according to claim 1, further comprising adding a coloring agent to the glass raw material batch.

6. The method according to claim 1, wherein the composition comprises 0.70-1.2 wt % of Fe$_2$O$_3$ based on 100 wt % of a soda lime mother glass composition.

7. The method according to claim 1, wherein an oxidation-reduction ratio of Fe$_2$O$_3$ is 0.25 to 0.35.

8. The method according to claim 1, wherein the composition comprises 0.12-0.35 wt % of TiO$_2$ based on 100 wt % of a soda lime mother glass composition.

9. The method according to claim 1, wherein
    the composition comprises 0.70-1.2 wt % of Fe$_2$O$_3$, and 0.12-0.35 wt % of TiO$_2$ based on 100 wt % of a soda lime mother glass composition; and
    an oxidation-reduction ratio of Fe$_2$O$_3$ is 0.25 to 0.35.

* * * * *